(12) United States Patent
Crandall (10) Patent No.: US 12,274,203 B2
(45) Date of Patent: Apr. 15, 2025

(54) AGRICULTURAL HEADER WITH LASER MEASUREMENT OF REEL DISTANCE

(71) Applicant: CNH Industrial America LLC, New Holland, PA (US)

(72) Inventor: Robert D. Crandall, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 163 days.

(21) Appl. No.: 17/923,337

(22) PCT Filed: May 6, 2021

(86) PCT No.: PCT/US2021/031082
§ 371 (c)(1),
(2) Date: Nov. 4, 2022

(87) PCT Pub. No.: WO2021/226333
PCT Pub. Date: Nov. 11, 2021

(65) Prior Publication Data
US 2023/0189707 A1    Jun. 22, 2023

Related U.S. Application Data

(60) Provisional application No. 63/020,724, filed on May 6, 2020.

(51) Int. Cl.
*A01D 41/127* (2006.01)
*A01D 57/04* (2006.01)

(52) U.S. Cl.
CPC ........... *A01D 41/127* (2013.01); *A01D 57/04* (2013.01)

(58) Field of Classification Search
CPC .............................. A01D 41/127; A01D 57/04
See application file for complete search history.

(56) References Cited

U.S. PATENT DOCUMENTS

| | | | |
|---|---|---|---|
| 6,651,411 B1 | 11/2003 | Becker et al. | |
| 8,478,492 B2 * | 7/2013 | Taylor | E02F 3/842 |
| | | | 701/485 |

(Continued)

FOREIGN PATENT DOCUMENTS

| | | | |
|---|---|---|---|
| DE | 10214648 A1 * | 10/2003 | ........... A01D 41/127 |
| DE | 102014209371 A1 | 11/2014 | |

(Continued)

OTHER PUBLICATIONS

International Search Report and Written Opinion for PCT Application No. PCT/US2021/031082 dated Jul. 29, 2021 (14 pages).

*Primary Examiner* — Justin Holmes
(74) *Attorney, Agent, or Firm* — Peter K. Zacharias (57) ABSTRACT

A header (110) for an agricultural harvester (100) includes: a frame (201); a cutter bar (111) carried by the frame; a otatable reel (112) movably coupled to the frame and having a plurality of tines (211); a target (310) associated with the reel such that movement of the reel causes a corresponding movement of the target; and a laser system (320) including a light emitter directed at the target. The laser system is configured to emit a laser beam at the target and output a distance signal (D) corresponding to a distance of at least one of the target or the reel from the light emitter.

12 Claims, 5 Drawing Sheets

(56) References Cited

U.S. PATENT DOCUMENTS

2019/0021226 A1\* 1/2019 Dima ................... A01D 34/008
2019/0254227 A1   8/2019 Roberge
2019/0307070 A1  10/2019 Dima et al.
2021/0153435 A1\* 5/2021 Martin ................. A01D 41/127
2024/0155975 A1\* 5/2024 Deruyter ............. A01D 41/127

FOREIGN PATENT DOCUMENTS

EP           2524085 B1 \* 8/2014  ............. E02F 3/847
EP           3001890 A1   4/2016
WO    WO-2019140512 A1 \* 7/2019  ......... A01D 41/1271

\* cited by examiner

AGRICULTURAL HEADER WITH LASER MEASUREMENT OF REEL DISTANCE

FIELD OF THE INVENTION

The present invention pertains to an agricultural harvester and, more specifically, to a header for an agricultural harvester.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Many headers include a reel with tines that rotate to force standing crops toward a cutter bar, which severs the standing crops. Control of the reel can affect the stubble height of cut crops. As such, accurate control of the reel is desirable.

What is needed in the art is a way to accurately control the reel during harvesting.

SUMMARY OF THE INVENTION

Exemplary embodiments disclosed herein provide a header with a movable reel, a target associated with the reel, and a laser system configured to emit a laser beam at the target and output a distance signal.

In some exemplary embodiments provided according to the present disclosure, a header for an agricultural harvester includes: a frame; a cutter bar carried by the frame; a rotatable reel movably coupled to the frame and having a plurality of tines; a target associated with the reel such that movement of the reel causes a corresponding movement of the target; and a laser system including a light emitter directed at the target. The laser system is configured to emit a laser beam at the target and output a distance signal corresponding to a distance of at least one of the target or the reel from the light emitter.

In some exemplary embodiments provided according to the present disclosure, an agricultural harvester includes a chassis and a header carried by the chassis. The header includes: a frame; a cutter bar carried by the frame; a rotatable reel movably coupled to the frame and having a plurality of tines; a target associated with the reel such that movement of the reel causes a corresponding movement of the target; and a laser system including a light emitter directed at the target. The laser system is configured to emit a laser beam at the target and output a distance signal corresponding to a distance of at least one of the target or the reel from the light emitter.

One possible advantage that may be realized by exemplary embodiments provided according to the present disclosure is that the laser system can be used to accurately determine the distance of the target and/or the reel, allowing accurate determination of the position of the reel to control the reel.

Another possible advantage that may be realized by exemplary embodiments provided according to the present disclosure is that the laser system allows contactless measurement of the distance and can thus be placed in an area where the system is less prone to mechanical damage.

Yet another possible advantage that may be realized by exemplary embodiments provided according to the present disclosure is that the laser system can be placed in a variety of different locations to measure different distances of the target and/or the reel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
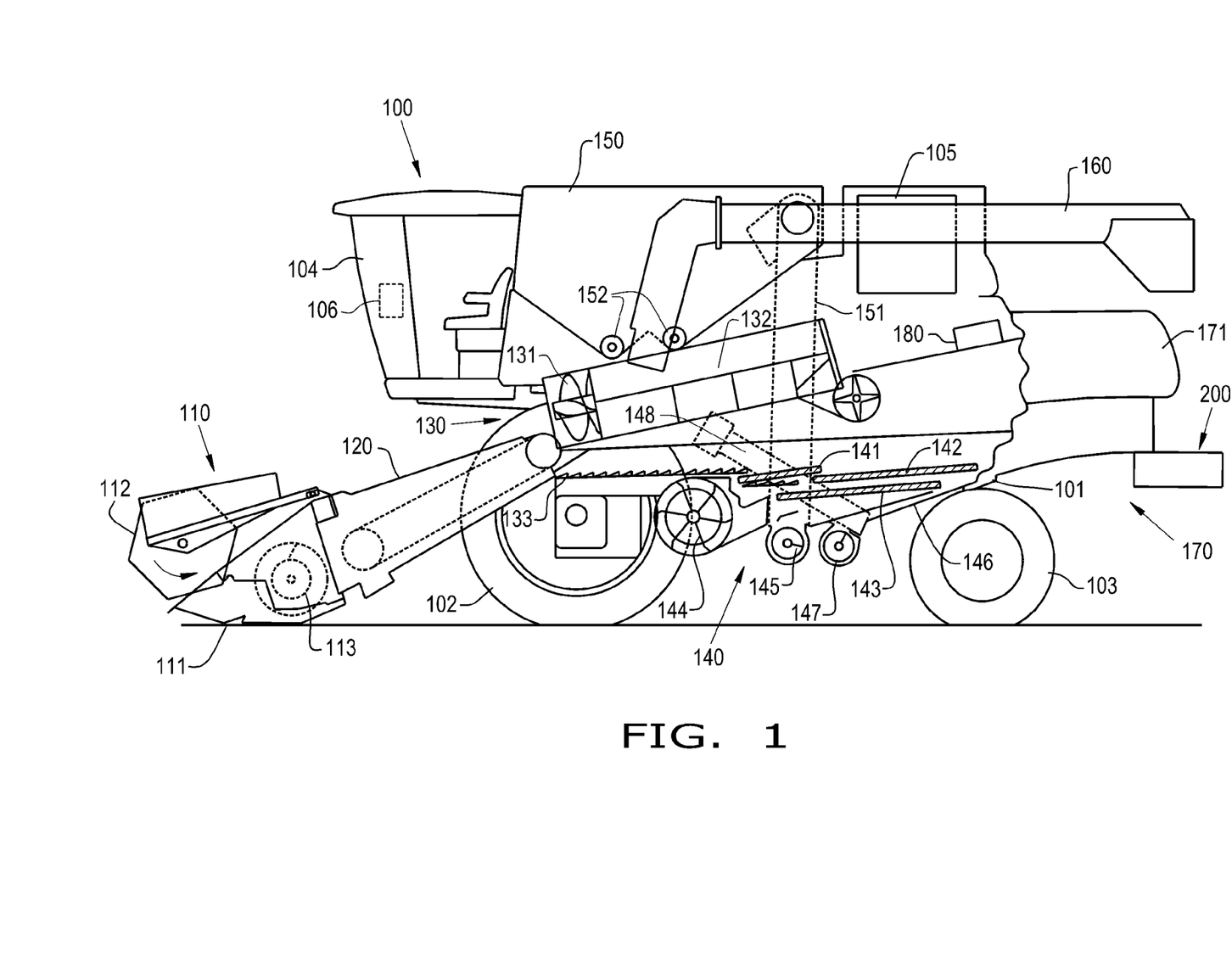
FIG. 1 illustrates a side view of an exemplary embodiment of an agricultural vehicle, the agricultural vehicle comprising a header, provided in accordance with the present disclosure.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100 by a spreader assembly 200. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
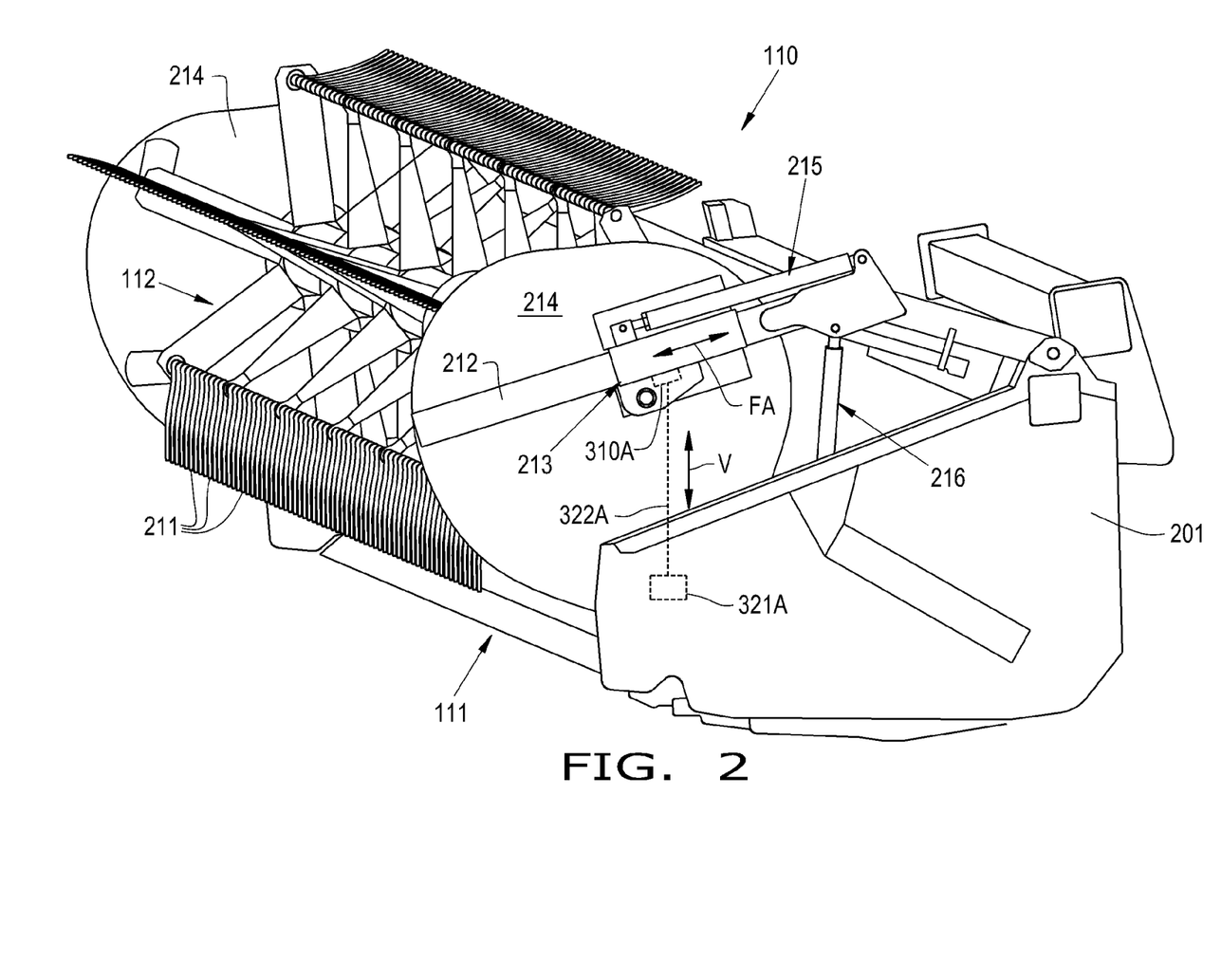
FIG. 2 illustrates a perspective view of the header illustrated in FIG. 1.

Referring now to FIG. 2, the header 110 of the combine 100 is illustrated in greater detail. The header 110 includes a frame 201 that carries the cutter bar 111 and the reel 112. The reel 112 includes a plurality of tines 211 that rotate with the reel 112 to move crops toward the cutter bar 111 for severing. The reel 112 is movably coupled to the frame 201 so the reel 112 may move relative to the frame 201. As illustrated, the reel 112 may be coupled to at least one reel arm 212, such as two reel arms, that is coupled to the frame 201. The reel 112 may, for example, include one or more slide brackets 213 that are coupled to a respective end plate 214 of the reel 112. Each slide bracket 213 slidably receives a respective reel arm 212 so the slide bracket 213, and thus the reel 112, can slide along the reel arm(s) 212. To slide the slide bracket 213 and the coupled reel 112 along the reel arm(s) 212, a slide actuator 215 may be coupled to each slide bracket 213 and reel arm 212. The slide actuator 215 may, for example, be configured to activate in order to slide the slide bracket 213 and the reel 112 in a fore-aft direction FA. In some embodiments, a lift actuator 216 is coupled to the frame 201 and the reel arm 212 and configured to activate in order to lift the reel arm 212 and the coupled reel 112 in a vertical direction V. It should thus be appreciated that the reel 112 may be movably coupled to the frame 201 in a variety of ways to move the reel 112 relative to the frame 201.

In known harvesters, the position of the reel is determined using a mechanical system that couples to the reel. While such systems are effective to accurately determine the position of the reel, it has been found that such systems are susceptible to damage during harvesting. In particular, such mechanical systems are prone to being damaged due to extending laterally from the sides of the header and contacting trees or other objects in a field during harvesting. When the measuring system is damaged, the actual position of the reel may differ significantly from the position that is determined based on readings from the measuring system, which can lead to inaccurate adjustments of the reel.

Figure 3:
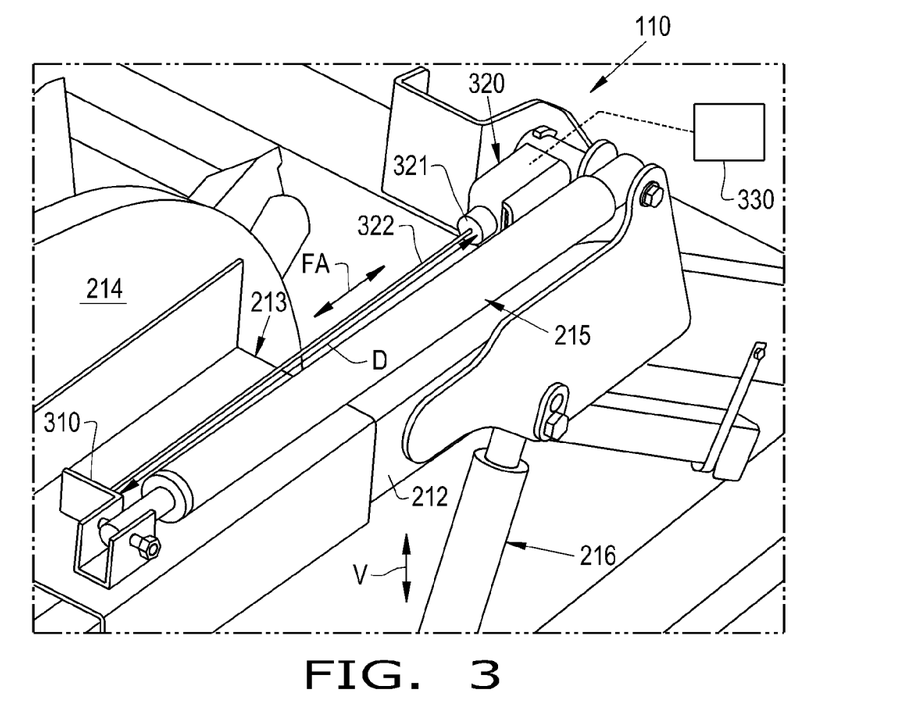
FIG. 3 illustrates a perspective view of a laser system and a target of the header of FIGS. 1-2.
Figure 4:
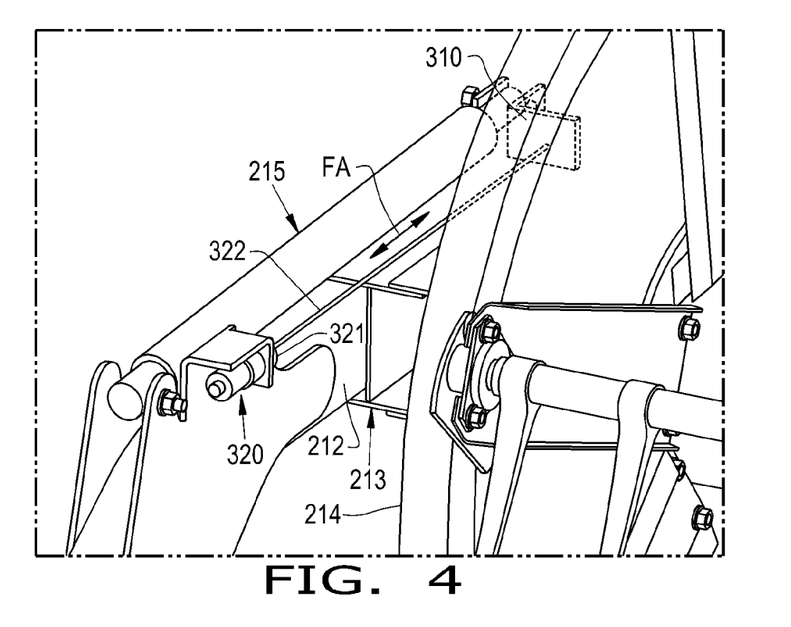
FIG. 4 illustrates another perspective view of the laser system of FIG. 3.

To address some of the previously described issues with known harvesters, and referring now to FIGS. 3-4 as well, the header 110 provided according to the present disclosure includes a target 310 associated with the reel 112 such that movement of the reel 112 causes a corresponding movement of the target 310 and a laser system 320 that includes a light emitter 321 directed at the target 310. It should be appreciated that the light emitter 321 may be directed at the target 310 directly, as illustrated, or, in some embodiments, may include one or more focusing lenses so the light emitter 321 is directed at the target 310 indirectly via the focusing lenses. The laser system 320 is configured to emit a laser beam 322, which may originate from the light emitter 321, at the target 310 and output a distance signal corresponding to a distance D of the target 310 and/or the reel 112 from the light emitter 321. As is known, the distance D may be calculated, for example, based on a time period of how long it takes for the emitted laser beam 322 to reflect off the target 310 and for the laser system 320 to detect the reflected laser beam. Thus, in some embodiments, the target 310 comprises a material that reflects the emitted laser beam 322 when the emitted laser beam 322 strikes the target 310, but it should be appreciated that the target 310 may alternatively comprise a material that is at least partially transparent to the emitted laser beam 322.

After the laser system 320 detects the reflected laser beam, the laser system 320 may output the distance signal, which can correspond to the distance D of the target 310 from the light emitter 321 and/or be used to determine the distance D of the reel 112 from the light emitter 321 based on a known spatial relationship between the target 310 and the reel 112. The output distance signal may be received by a controller 330 that is operably coupled to the laser system 320 and configured to determine a position of the reel 112 based on the distance signal and known geometry of the header 110. The controller 330 may be operably coupled to a display 106 (illustrated in FIG. 1) and configured to output a position display signal to the display 106, with the position display signal corresponding to a position of the reel 112. The display 106 may be configured to receive the position display signal and display a position value corresponding to the position of the reel 112. The position value may, for example, include the distance of the reel 112 from the mounting point of the header 110 to the chassis 101, or any other defined point, in the fore-aft direction FA and/or the distance of the reel 112 from the ground, or any other defined point, in the vertical direction V. It should thus be appreciated that the laser system 320 may be used to accurately determine and display a position of the reel 112 to an operator without having to use a mechanical measurement system.

The target 310 may be associated with the reel 112 in a variety of ways so the movement of the reel 112 causes a corresponding, i.e., reactionary, movement of the target 310. As illustrated, the target 310 may be a tab that is coupled to the reel 112. The target 310 may, for example, be coupled to the slide bracket 213 so the position of the reel 112 can be determined based at least partially on the position of the slide bracket 213, which is coupled to the reel 112. While the target 310 is illustrated and described as being directly associated with the reel 112, i.e., the reel 112 and the target 310 move the same distance in the same direction, in some embodiments the target 310 is indirectly coupled to the reel 112 such that movement of the reel 112 causes a corresponding movement of the target 310 that is not the same distance and/or in the same direction as movement of the reel 112. It should thus be appreciated that the target 310 and the laser system 320 may be configured in a variety of ways to allow the laser system 320 to output the distance signal corresponding to the distance D between the target 310 and/or the reel 112 from the light emitter 321.

In some embodiments, the light emitter 321 is directed at the target 310 such that the laser system 320 outputs a distance signal corresponding to a fore-aft distance, i.e., a distance in the fore-aft direction FA, of the target 310 and/or the reel 112 from the light emitter 321. As illustrated in FIGS. 3-4, the emitted laser beam 322 travels in the fore-aft direction FA before reflecting off the target 310, allowing the laser system 320 to output a distance signal that corresponds to a fore-aft distance. The light emitter 321 and the target 310 may both be placed laterally inward of the slide actuator 215, i.e., toward the end plate 214 of the reel 112, to reduce the risk of objects colliding with and damaging the light emitter 321 and/or the target 310. In some embodiments, a light emitter is directed at a target such that the output distance signal corresponds to a vertical distance, i.e., a distance in the vertical direction V, of the target and/or the reel 112 from the light emitter. Such an embodiment is illustrated in dashed lines in FIG. 2, with a target 310A placed on a bottom of the slide bracket 213 and a light emitter 321A emitting a laser beam 322A that travels in the vertical direction V to strike the target 310A. In some embodiments, the laser system 320 includes both fore-aft and vertically oriented light emitters 321, 321A and both targets 310, 310A may be associated with the reel 112 so both the fore-aft distance and the vertical distance can be measured to determine both the fore-aft and vertical positions of the targets 310, 310A and/or the reel 112.

Figure 5:
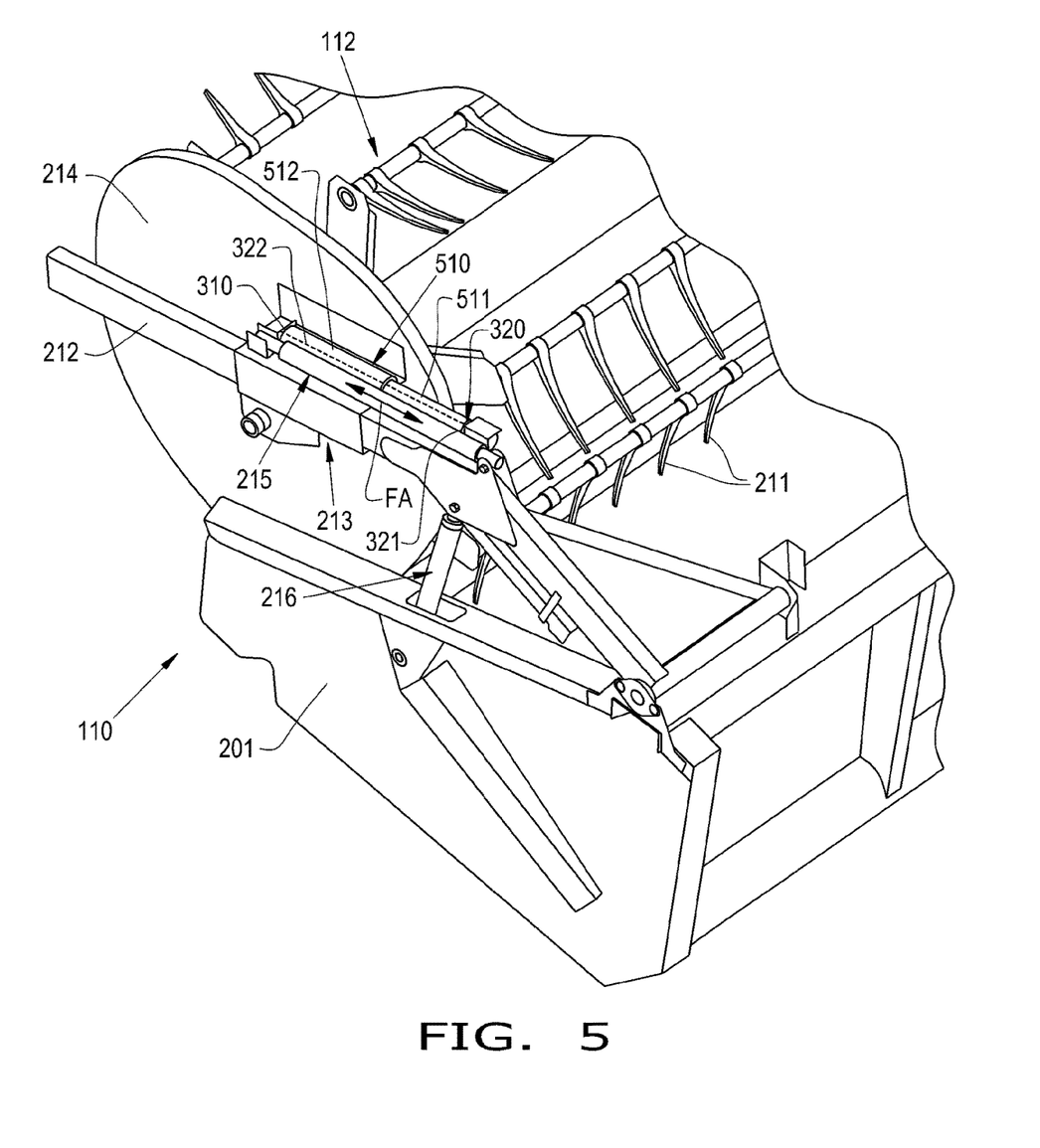
FIG. 5 illustrates a perspective view of the laser system of FIGS. 3-4 with an optional sleeve.
Figure 6:
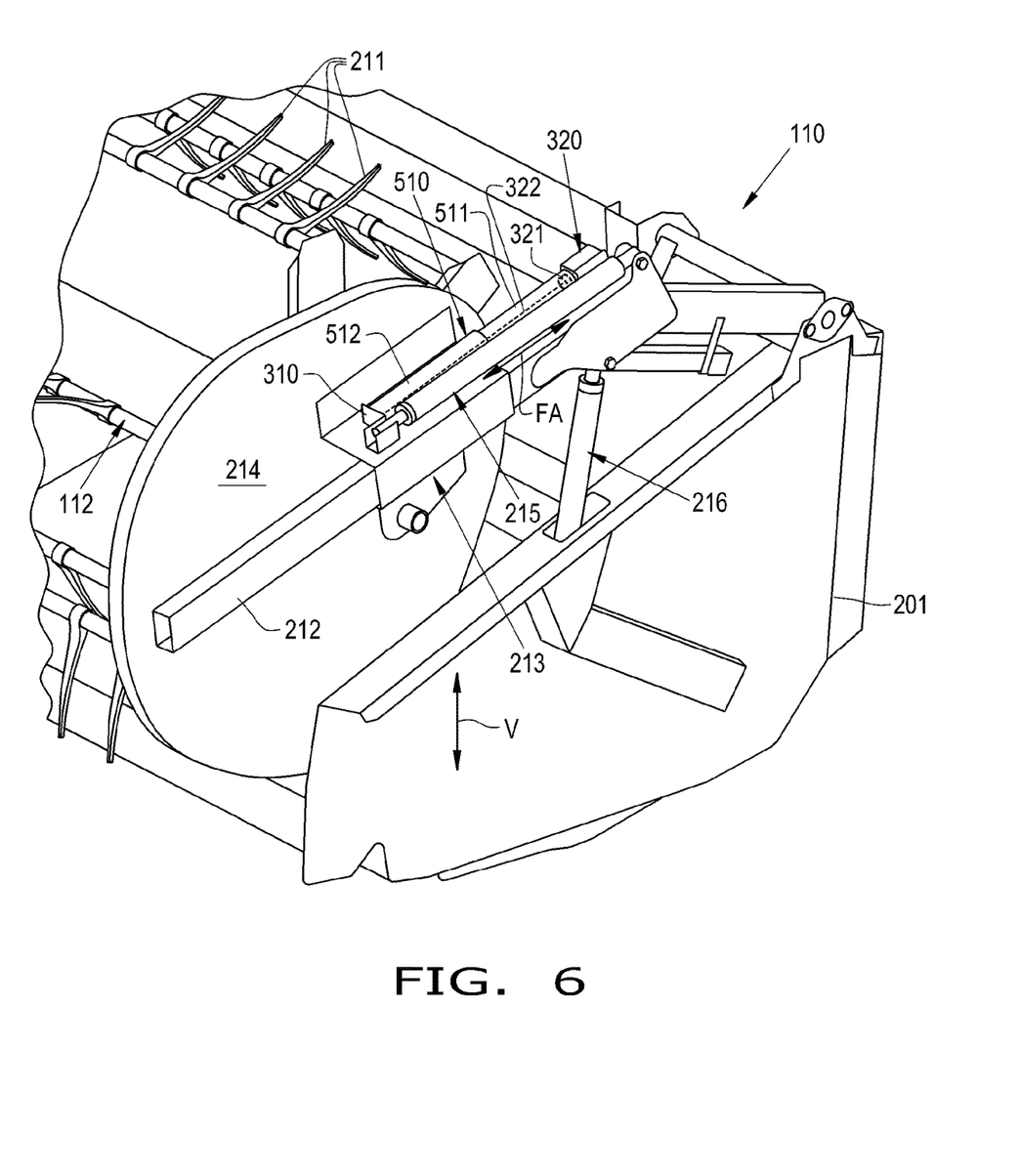
FIG. 6 illustrates another perspective view of the laser system of FIGS. 3-5 with the sleeve of FIG. 5.

In some embodiments, and referring now to FIGS. 5 and 6, the header 110 includes a sleeve 510 that encloses the light emitter 321 and the target 310. By enclosing the light emitter 321 and the target 310, debris and other particles can be prevented from interfering with travel of the emitted laser beam 322 to and from the target 310, which can increase the accuracy and precision of measurements. Enclosing the light emitter 321 and the target 310 can also protect the light emitter 321 and the target 310 from being damaged to increase the accuracy and precision of any measured distances. While the sleeve 510 is illustrated as fully enclosing both the light emitter 321 and the target 310 by extending between the light emitter 321 and the target 310, it should be appreciated that the sleeve 510 does not need to extend between the light emitter 321 and the target 310 and may only extend part of the way between the light emitter 321 and the target 310. In some embodiments, the sleeve 510 includes an emitter portion 511 that surrounds the light emitter 321 and a target portion 512 that surrounds the target 310 and is telescopically coupled to the emitter portion 511 so the target portion 512 may telescopically slide within the emitter portion 511, or vice versa. Each of the portions 511, 512 may be, for example, coaxial cylinders with one of the cylinders having a larger diameter than the other. Telescopically coupling the target portion 512 to the emitter portion 511 can allow the sleeve 510 to maintain full enclosure of the light emitter 321 and the target 310 when the reel 112 moves in the fore-aft direction FA and protect the light emitter 321 and the target 310 regardless of the position of the reel 112.

From the foregoing, it should be appreciated that providing the header 110 with the target 310 and the laser system 320 according to the present disclosure provides a convenient and reliable way to measure and determine the position of the reel 112. The risk of inaccurate and/or unreliable measurements due to damage can be mitigated by using the laser system 320, which can be placed in a variety of locations where the target 310 and/or the light emitter 321 are shielded from contact with objects and debris. Further, the header 110 can include a sleeve 510 that encloses the target 310 and the light emitter 321 to further reduce the risk of damage to the target 310 and the light emitter 321 during operation. Thus, it should be appreciated that the header 110 provided according to the present disclosure including the target 310 and the laser system 320 can be less prone to inaccurate measurements of the position of the reel 112 than known headers that utilize a mechanical measuring system.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural harvester, comprising:
a frame;
a cutter bar carried by the frame;
a rotatable reel movably coupled to the frame and comprising a plurality of tines;
at least one reel arm that is movably coupled to the frame, the rotatable reel comprising a slide bracket that slidably receives the at least one reel arm,
a target associated with the reel such that movement of the reel causes a corresponding movement of the target, wherein the target comprises a tab that is coupled to the slide bracket; and
a laser system comprising a light emitter coupled to the at least one reel arm such that the light emitter is configured to move along with the tab as the reel arm and the reel are lifted together,
wherein the light emitter is directed at the tab, the laser system being configured to emit a laser beam at the tab and output a distance signal corresponding to a distance between the tab and the light emitter.

2. The header of claim 1, wherein the light emitter is directed at the target such that the output distance signal corresponds to a fore-aft distance of at least one of the target or the reel from the light emitter.

3. The header of claim 1, wherein the light emitter is directed at the target such that the output distance signal corresponds to a vertical distance of at least one of the target or the reel from the light emitter.

4. The header of claim 1, further comprising a sleeve enclosing the light emitter and the target.

5. The header of claim 4, wherein the sleeve comprises an emitter portion surrounding the light emitter and a target portion surrounding the target and telescopically coupled to the emitter portion.

6. An agricultural harvester, comprising:
a chassis; and
a header carried by the chassis, the header comprising:
a frame;
a cutter bar carried by the frame;
a rotatable reel movably coupled to the frame and comprising a plurality of tines;
at least one reel arm that is movably coupled to the frame, the rotatable reel comprising a slide bracket that slidably receives the at least one reel arm;
a target associated with the reel such that movement of the reel causes a corresponding movement of the target, wherein the target comprises a tab that is coupled to the slide bracket; and
a laser system comprising a light emitter coupled to the at least one reel arm such that the light emitter is configured to move along with the tab as the reel arm and the reel are lifted together,
wherein the light emitter is directed at the tab, the laser system being configured to emit a laser beam at the tab and output a distance signal corresponding to a distance between the tab and the light emitter.

7. The agricultural harvester of claim 6, wherein the light emitter is directed at the target such that the output distance signal corresponds to a fore-aft distance of at least one of the target or the reel from the light emitter.

8. The agricultural harvester of claim 6, wherein the light emitter is directed at the target such that the output distance signal corresponds to a vertical distance of at least one of the target or the reel from the light emitter.

9. The agricultural harvester of claim 6, further comprising a sleeve enclosing the light emitter and the target.

10. The agricultural harvester of claim 9, wherein the sleeve comprises an emitter portion surrounding the light emitter and a target portion surrounding the target and telescopically coupled to the emitter portion.

11. The agricultural harvester of claim 6, further comprising a controller operably coupled to the laser system and configured to:
receive the distance signal;
determine a position of the reel based on the distance signal; and
output a position display signal to a display.

12. The agricultural harvester of claim 11, further comprising a display operably coupled to the controller and configured to:
receive the position display signal; and
display a position value corresponding to the position of the reel.

* * * * *